March 14, 1961 P. VAN ACKEREN 2,975,109
APPARATUS FOR DRAWING OFF THE CHARGING
GASES FROM COKING CHAMBERS
Filed Jan. 14, 1959
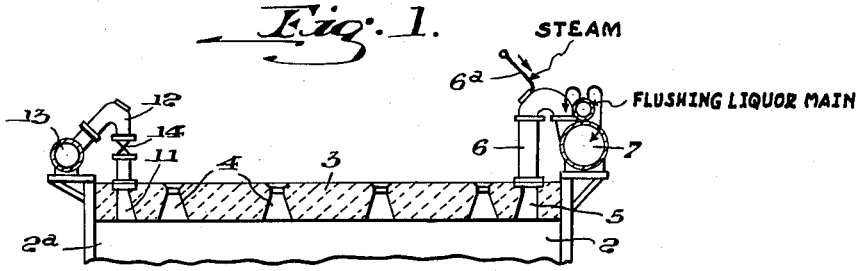
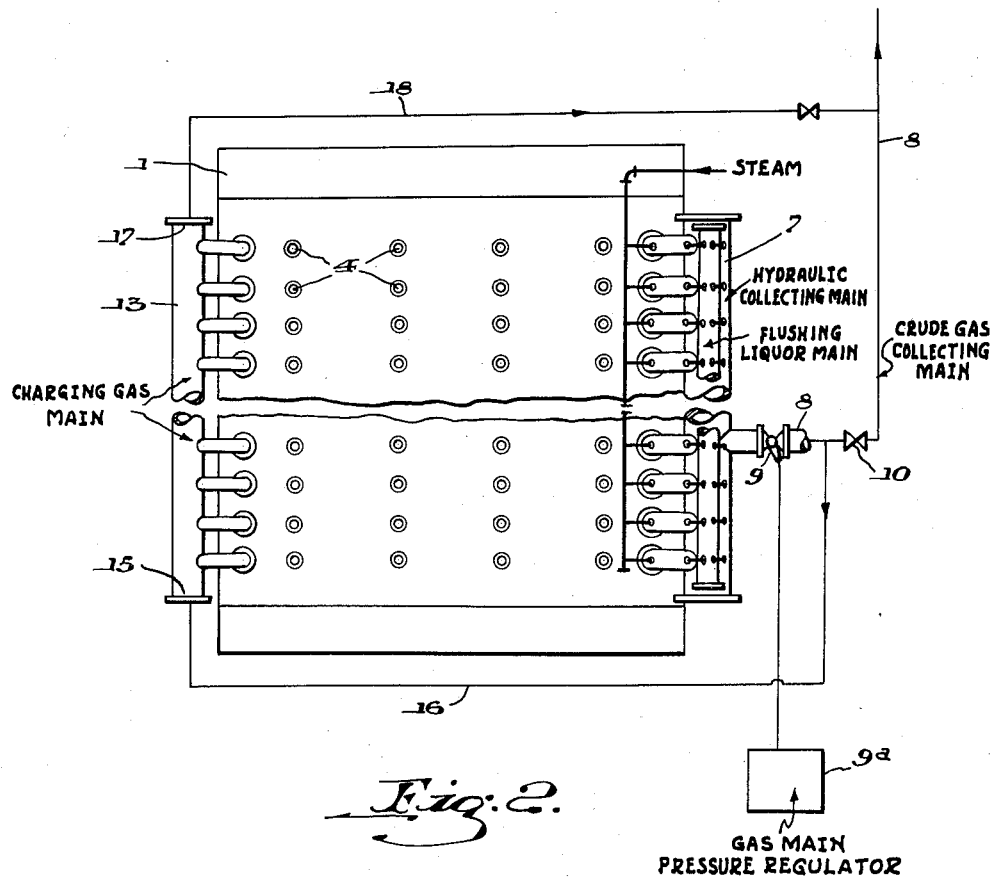
INVENTOR.
PAUL VAN ACKEREN
BY Thomas J. P. O'Brien.
his ATTORNEY

United States Patent Office 2,975,109
Patented Mar. 14, 1961

2,975,109

APPARATUS FOR DRAWING OFF THE CHARGING GASES FROM COKING CHAMBERS

Paul van Ackeren, Essen, Germany, assignor, by mesne assignments, to Koppers Company, Inc., Pittsburgh, Pa., a corporation of Delaware Filed Jan. 14, 1959, Ser. No. 786,743

4 Claims. (Cl. 202—109)

The invention relates to an apparatus for drawing off the charging gases from coking chambers with a hydraulic collecting main (tar precipitating main) for the distillation gas arranged on the oven battery and a charging-gas line connected on one end with the crude-gas collecting main branching off from the hydraulic collecting main.

The charging gases produced suddenly in the oven chambers in rather large amounts on charging the oven chamber with coal must be drawn off raipdly from the ovens in order to prevent an escape to the atmosphere from the charging holes in the oven crown and through the funnel of the charging car and the leveling hole of the oven door. Withdrawal of the charging gases by suction through the hydraulic collecting main is only incompletely possible with the customary means. Therefore, attempts have been made to burn the charging gases in special apparatus or in combustion apparatus connected with the charging car. It is also known to convey the gases through a line arranged on the oven battery into the waste gas stack or furnace.

The charging gases contain substantial amounts of steam and air, resulting in the danger of the formation of explosive mixtures.

An object of the invention is to prevent the formation of explosive mixtures in the charging-gas main by mixing crude gas from the aforesaid crude-gas collecting main.

This object is accomplished according to the invention, by connecting one of two ends of the charging-gas main with the crude gas collecting main at a second point and also connecting the other of the two ends of the charging gas main with the crude gas collecting main at a first point after the second point at which said one end of the charging-gas main is connected to the crude gas collecting main, and by means in the form of valves provided between said second point and the hydraulic main for effecting the recirculation of distillation gas through the charging-gas main, by the pressure differential along the crude gas collecting main.

The means for recirculation of crude gas can thus consist in maintaining a higher pressure in the hydraulic collecting main or in the portion of the crude gas connecting main between the pressure regulator of the hydraulic collecting main and the rest of the crude-gas collecting main, to which the charging gas exhaust main is connected, than in the rest of the crude-gas collecting main itself in which the recirculated distillation gases mixed with the charging gases are to be later introduced; and maintaining the cross-section of the charging-gas main, including its connecting lines to the crude gas main, considerably larger than the cross-section of each of the ascension pipe lines which connect the oven chambers with the charging-gas main. In this way, the amount of crude gas sucked through the charging-gas main from the crude gas main amounts to a multiple of the amount of charging gas which is thereby mixed with the crude gas in the charging gas main, so that the upper explosion limit is considerably exceeded.

The flow of distillation gas through the charging-gas main can thus also be forced by mechanical means, for example, by one or more steam injectors or by the installation of a recirculating fan.

The charging gas is drawn off rapidly through the charging-gas main and also the distillation-gas through the hydraulic collecting main.

The invention is illustrated by way of example in the accompanying drawing.

Figure 1 illustrates a vertical section through the upper part of an oven chamber of a battery with its charging-gas main for offtake of the smoke and gases evolved during coal charging, and its hydraulic collecting main for offtake of the distillation gas.

Figure 2 illustrates a top plan view of an oven battery according to Figure 1.

The coke-oven battery 1 consists of a series of adjacently arranged horizontal oven chambers 2 with heating walls 2a arranged therebetween. In the top 3 of the ovens, there are arranged charging holes 4 through which the oven chambers 2 are charged with coal by means of a charging car, not illustrated. On the one end of each oven chamber 2 in the oven crown 3 there is arranged an ascension pipe suction outlet 5 which is connected with an ascension pipe 6 and through which the distillation gas formed in the coking process in oven chamber 2 is withdrawn into a hydraulic collecting main 7 in which it is sprayed with aqueous ammonia condensate from the gas for precipitation of the tar from the gas. The distillation gas is withdrawn from hydraulic collecting main 7, to, and through, a crude-gas collecting main 8 by means of a conventional exhauster (not illustrated) and it is thereafter further processed. By means of a regulator 9 arranged in the crude-gas collecting main 8, directly after the hydraulic collecting main 7, the pressure in the oven chamber is maintained at a slight excess pressure, for example +4 mm. water column. A valve 10 is arranged after regulator 9 in crude gas collecting main 8.

On the other side of the oven there is also arranged in the oven crown 3 another ascension pipe suction outlet 11, to which is connected an ascension pipe connecting line 12 leading to a charging-gas main 13 arranged along the oven battery top. Connecting line ascension pipe 12 is provided with a valve 14. The charging-gas main 13 is connected at one end 15 by a connecting line 16, with the crude-gas collecting main 8 between the regulator valve 9 and valve 10. The other end 17 of the charging-gas main 13 is connected by means of a connecting line 18 with the crude-gas collecting main 8 after the point in the line containing the valve 10.

The cross-sections of the charging-gas main 13 and both connecting lines 16, 18 are so proportioned larger than the ascension pipes 12, 6, and the pressure in the collecting main 8 is so maintained by a conventional gas main pressure regulator 9a, that a part of the distillation gas withdrawn through the hydraulic collecting main 8 is sucked therefrom through connecting line 16 and through charging-gas main 13 and then goes through connecting line 18 into the crude-gas collecting main 8 at a point beyond the valve 10. For example, a reduced pressure of −20 mm. water column can be maintained in the crude gas collecting main 8 between the valve 10 and the regulator 9 by adjustment of valve 10, while a reduced pressure of −50 mm. water column is maintained in collecting main 8 after valve 10. In this way, a greater suction is maintained in connecting line 18 than in line 16 between the regulator 9 and valve 10 so that larger amounts of distillation gas flow constantly through line 16 into charging gas main 13, and line 18 back to main 8.

During the charging of an oven chamber the valve 14 arranged in connecting line 12 of the corresponding oven chamber and the steam to the injector nozzle in ascension pipe 6a are open, so that the suddenly produced charging gas and smoke goes both through top opening 11 into charging-gas main 13 and through top opening 5 into hydraulic collecting main 7. By recirculation through line 16 of distillation gas through charging-gas main 13, the charging gas is continuously mixed with distillation gas so that the formation of an explosive mixture of considerable amounts of air with the charging gas is prevented.

I claim:

1. Apparatus for drawing off the charging gases formed during the charging of horizontal coke ovens with coal, comprising: an hydraulic gas collecting main for offtake of the distillation gas arranged on the coke oven battery and a crude-gas collecting main communicating with and leading from the hydraulic gas collecting main, with a charging-gas main communicably connected at one end with a portion of the crude-gas collecting main at a first point remote from the hydraulic collecting main; and in which the other end of the charging-gas main is communicably connected by a connecting line with the crude-gas collecting main at a second point therein before the first point at which said one end of the charging main is connected thereto; and means are provided for effecting recirculation of distillation gas from said second point to, and through, the charging-gas main.

2. Apparatus for drawing off the charging gases formed during the charging of horizontal coke ovens with coal, comprising: an hydraulic gas collecting main for offtake of the distillation gases arranged on the coke oven battery and a crude-gas collecting main communicating with, and leading from, the hydraulic gas collecting main for off-flow of the gas from the hydraulic main, with a charging-gas main communicably connected at one end with a portion of the crude-gas collecting main at a first point remote from the hydraulic collecting main to discharge gas and smoke from the charging gas main to the crude gas collecting main, and in which the other end of the charging-gas main is communicably connected with the crude gas collecting main to receive gas therefrom by a connecting line leading from a second point therein before the first point at which said one end of the charging main is connected thereto, and means are provided in the crude gas collecting main between said second point and said first point to produce a higher pressure in the line for effecting recirculation of distillation gas from the crude gas collecting main at said second point through said connecting line to the other end of, and through, the charging-gas main to the aforesaid one end thereof and back into the crude-gas collecting main at said first point therein.

3. Apparatus as claimed in claim 2, and in which the means for effecting recirculation of gas from said second point to the charging-gas main comprises a valve in the crude-gas collecting main between said first point remote from the hydraulic gas collecting main and the hydraulic gas collecting main with the connecting line leading from said second point in the crude-gas collecting main at a region between the valve and the hydraulic gas collecting main.

4. Apparatus as claimed in claim 3, and which includes a pressure regulator in the crude-gas collecting main before the afosesaid valve and second point therein.

References Cited in the file of this patent
UNITED STATES PATENTS

| | | |
|---|---|---|
| 1,752,363 | Becker et al. | Apr. 1, 1930 |
| 1,886,949 | Folsom | Nov. 8, 1932 |
| 2,488,952 | Wilputte et al. | Nov. 22, 1949 |